US006153303A

United States Patent [19]

Namura et al.

[11] Patent Number: 6,153,303

[45] Date of Patent: Nov. 28, 2000

[54] TETRAFLUOROETHYLENE COPOLYMER COMPOSITION FOR COATING METAL ARTICLES

[75] Inventors: Sinichi Namura; Takahiko Iwasaki, both of Shimizu, Japan

[73] Assignee: Dupont Mitsui Fluorochemicals, Tokyo, Japan

[21] Appl. No.: 09/136,037

[22] Filed: Aug. 19, 1998

[51] Int. Cl.[7] ............................ C08L 27/18; C08L 67/00; B32B 27/30

[52] U.S. Cl. .......................... 428/421; 428/422; 525/151; 525/167; 525/176; 427/385.5; 427/388.1; 427/388.2

[58] Field of Search .................................... 525/151, 167, 525/176; 428/421, 422; 427/385.5, 388.1, 388.2

[56] References Cited

U.S. PATENT DOCUMENTS

| | | | |
|---|---|---|---|
| 3,635,926 | 1/1972 | Gresham et al. . | |
| 3,642,742 | 2/1972 | Carlson | 260/37.5 A |
| 4,118,372 | 10/1978 | Schaefgen | 527/190 |
| 4,499,249 | 2/1985 | Nakagawa et al. | 326/206 |
| 5,750,626 | 5/1998 | Shimizu . | |
| 5,767,198 | 6/1998 | Shimizu . | |

FOREIGN PATENT DOCUMENTS

| | | |
|---|---|---|
| 62-098028 | 5/1987 | Japan . |
| 06145315 | 5/1994 | Japan . |
| 08295828 | 11/1996 | Japan . |

*Primary Examiner*—David J. Buttner

[57] ABSTRACT

Fluoropolymer compositions containing melt-flowable tetrafluoroethylene copolymers with reactive end groups and isotropic polyesters have excellent adhesion to metal substrates, especially steel, and excellent water resistance.

10 Claims, No Drawings

TETRAFLUOROETHYLENE COPOLYMER COMPOSITION FOR COATING METAL ARTICLES

FIELD OF THE INVENTION

This invention is in the field of tetrafluoroethylene copolymer compositions and is specifically concerned with the increased adherability of these copolymers to metal.

BACKGROUND OF THE INVENTION

Copolymers of tetrafluoroethylene and fluorovinyl compounds are used in coating metal substrates because of their excellent non-stick properties, chemical resistance, and heat resistance. However, poor adhesion of these copolymers to the substrate is a drawback. Such problems with adhesion have hitherto been addressed by carrying out surface pretreatment such as sandblasting the substrate to roughen it, followed by the coating of a primer. The primer is often a mixture of fluorocarbon resin with adhesion promoters such as heat resistant polymer resin, e.g., polyimide, polyamideimide, polyether sulfone or polyphenylene sulfide.

However, with certain metal substrates, especially stainless steel, even with pretreatment, it has not been easy to obtain a bonding coat which has sufficient water resistance. Further, it is costly and unduly complex to have to perform several coating steps.

SUMMARY OF THE INVENTION

The invention provides a composition of tetrafluoroethylene copolymer which has excellent adhesion to metal substrates, especially steel materials. The coating composition is characterized by excellent water resistance, and is applied without complex pretreatment of the metal substrate.

Specifically the invention provides a composition comprising (1) a copolymer derived from units of tetrafluoroethylene and fluorovinyl compound, the copolymer having reactive end groups, and (2) an isotropic polyester resin derived from units of aromatic dicarboxylic acid and aromatic diol.

The invention further provides for an article coated with a baked composition wherein the composition prior to baking comprises the tetrafluoroethylene copolymer composition of this invention. The baking of the composition causes an interaction between the reactive end groups of the copolymer and the polyester resin to provide the adhesion and water resistance described above. Evidence of this interaction is that when either the reactive end groups or the polyester are not present in the composition, adhesion to metal substrates is not obtained. Thus the copolymer composition of this invention contains an amount of reactive end groups effective in producing an adhesive bond having an initial peel strength of at least 1N/mm.

The invention also includes a process for applying the copolymer composition to an article and baking the article to obtain a coated article that has a bonding layer with excellent adhesion and water resistance. Therefore, the copolymer composition of this invention may be used for coating many types of metal articles, especially stainless-steel or steel articles, including equipment such as pipes, storage tanks, hoppers and valves in processes within the chemical, food products, electronics and machine industries, as well as machine components, kitchen utensils and the like.

DETAILED DESCRIPTION

The compositions of this invention are obtained by blending a small amount of a isotropic polyester resin into a melt-flowable copolymer of a tetrafluoroethylene (TFE) and a fluorovinyl compound, the copolymer having reactive end groups. The composition has excellent melt-bonding properties with respect to steel materials and also has excellent water resistance.

The copolymer of tetrafluoroethylene with a fluorovinyl compound of the invention may be selected from among copolymers which are flowable at and above their melting points, and which have melt-flow rates (MFR) at 372±1° C., as measured according to ASTM D-3307, which are fm 0.5 to 500 g/10 min, and preferably from 0.5 to 50 g/10 min. Preferable fluorovinyl compounds include perfluoro olefin having 3 to 10 carbons, and perfluoro(alkyl vinyl ether) (PAVE) of the formula (I)

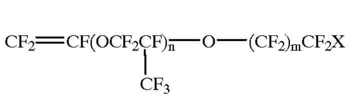

(I)

(wherein X is H or F, m is an integer from 0 to 7, and n is an integer from 0 to 4) or of the formula (II)

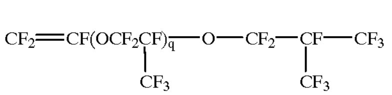

(II)

(wherein q is an integer from 0 to 3). Preferred copolymer compositions include copolymers of TFE with at least one of hexafluoropropylene (HFP) and PAVE. Preferred comonomers include PAVE in which the alkyl group contains 1–3 carbon atoms, especially 2–3 carbon atoms, i.e. perfluoro (ethyl vinyl ether) (PEVE) and perfluoro(propyl vinyl ether) (PPVE).

The fluorovinyl compound content within the copolymer is generally selected from a range of 0.5 to 20 mol %. In this invention, the above-described tetrafluoroethylene copolymer must have reactive end groups. Illustrative examples of the reactive end groups include —COOH, $—CONH_2$, $—CH_2OH$, $—COOCH_3$, —COF and $—CF{=}CF_2$. The presence of such end groups can be verified by measurement of the infrared absorption spectra described later in this specification. Preferably, at least one of these reactive end groups is present in a ratio of 6 or more groups per $10^6$ carbons in the tetrafluoroethylene copolymer.

The tetrafluoroethylene copolymer composition of this invention may be produced by aqueous polymerization (as described in U.S. Pat. No. 3,635,926) or polymerization in a perhalogenated solvent (U.S. Pat. No. 3,642,742) or hybrid processes involving both aqueous and perhalogenated phases (U.S. Pat. No. 4,499,249). Free radical polymerization initiators and chain transfer agents are used in these polymerizations and have been widely discussed in the patent literature. For example, persulfate initiators and alkane chain transfer agents are described for aqueous polymerization of TFE/PAVE copolymers. Fluorinated peroxide initiators and alcohols, halogenated alkanes, and fluorinated alcohols are described for nonaqueous or aqueous/nonaqueous hybrid polymerizations.

The selections of the initiator and chain transfer agent dictate the end groups on the polymer chain. Persulfate initiators are known to give —COOH end groups in aqueous polymerization. If a polymerization buffer, such as an ammonium salt, is employed, $—CO_2NH_4$ end groups are obtained which convert to $—CONH_2$ ends during thermal conditioning. If methane is used as a chain transfer agent, —$CF_2H$ and —$CF_2CH_3$ ends will also be present in the resin.

In a nonaqueous polymerization (or aqueous/nonaqueous), peroxides such as $(ClF_2C(CF2)_nCOO)_2$ may be used as initiators, leading to —$CF_2Cl$ end groups. If methanol is used as the chain transfer agent, —$CF_2H$ and $CF_2CH_2OH$ end groups will also be present. In this type polymerization, —COF end groups are also formed by unimolecular rearrangement of a PAVE radical on a growing chain. The end groups of the TFE/PAVE copolymers are chemically reactive.

The isotropic polyesters of the present invention are derived from units of one or more aromatic dicarboxylic acids and one or more aromatic diols. Whether a polymer is isotropic or anisotropic (liquid crystalline) may be determined by using the Thermo-Optical Test (TOT) as described in U.S. Pat. No. 4,118,372.

Anisotropic polymers (liquid crystal polymer—LCP) are characterized by their unique ability to form regions of high molecular orientational order in the melt. This orientation can be carried over into the solid state. Isotropic polyesters have a random orientation in the melt. According to the reference, it is well known that translucent optically anistropic materials cause light to be transmitted in optical systems equipped with cross polarizers, where as transmission of light is theoretically zero for isotropic materials. Optical anistropy can be determined by placing a sample of polymer on a heating stage of a polarizing microscope and bringing the temperature up to and beyond the polymer flow temperature. If the polymer is optically anisotropic in the melt, a bright field will be observed at temperatures above the polymer flow temperature. The absence of such light is indicative of an isotropic material.

Preferable aromatic dicarboxylic acids are those having the general formula

HOOC-Ar-COOH (wherein Ar is an arylene group such as a o-phenylene group, an m-phenylene group or a p-phenylene group). Examples include terephthalic acid and isophthalic acid.

Preferable aromatic diols are those having the general formula

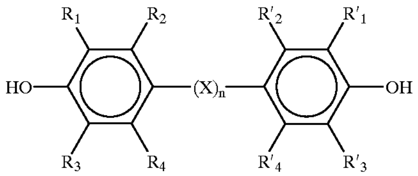

(wherein n is 0 or 1; —X—is —O—, —S—, —SO2—, —CO—, an alkylene group or an alkylidene group; and R1–4 and R'1–4 are hydrogen atoms, halogen atoms or alkyl groups). Examples include p,p'-biphenol and 2,2-bis(4-hydroxyphenyl)propane (bisphenol A).

The polyester used in the present invention may be synthesized from the above-described aromatic dicarboxylic acids and aromatic diols, or functional derivatives thereof, by a known method such as interfacial polycondensation, solution polycondensation or melt polycondensation. Functional derivatives of aromatic dicarboxylic acids that may be used include acid halides, diallyl esters, diallyl esters or other derivatives of aromatic dicarboxylic acids. Functional derivatives of aromatic diols that may be used include alkali metal salts, aliphatic monocarboxylic acid diesters or other derivatives of aromatic diols.

The polyester used in this invention contains as the essential constituent units the above-described aromatic dicarboxylic acids and aromatic diols, although it may also include other constituent units, such as aromatic hydroxycarboxylic acids.

In this invention, the above-described polyester is preferably compounded in a proportion of 0.1 to 20 parts by weight, and more preferably, 0.1 to 10 parts by weight, per 100 parts by weight of the tetrafluoroethylene copolymer. When less than 0.1 part by weight is compounded, the resulting composition does not have sufficient adhesive to the substrate. On the other hand, when more than 20 parts by weight is compounded, the adhesive strength tends to decrease, in addition to which the heat resistance and chemical resistance of the composition worsen, which is undesirable. There is no particular limitation on the particle size, shape or the like of the polyester in the composition, although particles no larger than about 20 lm are preferable for obtaining a smooth coat.

Adhesion of the composition of this invention to metal substrates is promoted by the presence of reactive end groups in the copolymer. But the presence of such end groups is insufficient to create strong adhesion to substrates such as stainless steel. It is the combination of the reactive end groups of the copolymer with the polyester, upon baking, which creates superior adhesion to steel substrates. "Steel articles or substrates," as used herein, refers to articles made of steels, including carbon steels and special steels, such as equipment and mechanical implements for industrial and domestic use, as well as parts thereof. There is no limit to the shape and dimensions of these steel articles, so long as the coating operation can be carried out.

In the invention, the adhesion of the composition to steel materials can be further enhanced by blending particles of inorganic substances into the composition. Useful inorganic substances may be selected from among substances known as solid acids or solid bases. Illustrative examples of such inorganic substances include:

(1) metal oxides such as $Al_2O_3$, $TiO_2$, MgO, ZnO and $SiO_2$, or mixtures thereof, and metal double oxides such as $SiO_2$—$Al2O_3$ and $K_2O$—$TiO_2$;

(2) clay minerals such as acid clay, kaolinite, bentonite, montmorillonite and talc; and silicate compounds such as mica, zeolite and silicate glass;

(3) metal sulfates such as aluminum sulfate and calcium sulfate;

(4) metal carbonates such potassium carbonate; and (5) metal hydroxides such as calcium hydroxide.

The shape of the inorganic particles is not critical. For example, the particles may be granular, flake-like, or fibrous. Nor is there any particular limitation on the particle size, although a particle size of no more than 20 $\mu$m is preferable with regard to the formability of the composition and the surface smoothness of coating and lamination films, for example. The optimal amount of inorganic particle addition varies depending on such factors as the specific surface area, although this amount is generally selected from a range of 0.01 to 30% by weight.

In addition to the ingredients described above, a high temperature resistant resin may also be blended into the composition of the invention in order to enhance the wear resistance and hardness of the coat, or for some other purpose. The high temperature resistant resin comprises a polymer which is film-forming upon heating to fusion, is thermally stable, and has a sustained temperature use of at least about 140° C. A high temperature resistant resin is well known in nonstick finishes for adhering fluoropolymer to substrates and for film-forming and for conferring wear and abrasion resistance. The resin is generally non-fluorine containing and yet adheres to fluoropolymer. Examples of such polymers include one or more: (1) polysulfones, which are amorphous thermoplastic polymers with a glass transition temperature of about 185° C. and a sustained service temperature of about 140° C. to 160° C., (2) polyethersulfones, which are amorphous thermoplastic polymers with a glass transition temperature of about 230° C. and a sustained temperature service of about 170° C. to 190° C., (3) polyphenylene sulfides, which are partially crystalline polymers with a melting temperature of about 280° C. and a sustained temperature service of about 200° C. to 240° C., (4) polyimides and/or polyamideimides, or the polyamide acid precursors thereof (e.g., polyamic acid salt), which crosslink upon heating of the coating to fuse it which have a sustained service temperature in excess of 250° C., polyaryleneetherketones, such as polyetheretherketone and (5) polyetherketoneketone, which have a sustained use temperature of at least about 250° C; the amorphous ketone polymers should have a glass transition temperature of at least about 145° C., and the crystalline ketone polymers, a melting temperature of at least about 290° C., among others. All of these polymers are thermally stable and dimensionally stable at temperatures within their sustained service range and below, and they are wear resistant. These polymers also adhere well to clean metal surfaces. Polyimides and/or polyamideimides have been found to especially useful due to their ability to confer excellent abrasion resistance and thermal resistance to the composition.

The method for blending the above-described ingredients into the tetrafluoroethylene copolymer may be selected as appropriate for the coating method from among conventional, prior-art methods such as melt-kneading, dry mixing and wet mixing.

Various methods may be employed for coating steel articles with the compositions, depending on the shape of the articles. For example, use may be made of a method that involves applying a powder composition onto the surface of the article by a powder coating process such as electrostatic spray-coating or fluidized-bed coating, then heating and thereby baking; a method which involves applying a composition in the form of a dispersion onto the surface of the article, then similarly baking; or, in cases where the inner surface of a tubular body or container is coated, a method wherein a coat is obtained by using a rotational lining process to apply a dispersion-type composition. Moreover, in the case of steel sheet, for example, coating may be carried out by using a roller or the like to press the composition as a film against the steel sheet that has been preheated to at least the melting point of the tetrafluoroethylene copolymer. Baking temperatures usually range from 320° C. to 450° C.

When coating metal articles, especially stainless steel, with the composition of this invention, a bonding coat having excellent water resistance can be obtained merely by first administering conventional degreasing treatment on the smooth substrate, with no need to subject the article to any surface roughening pretreatment. Adhesion may of course be further enhanced by carrying out sandblasting treatment or the like. In the case of materials which are prone to rusting, such as mild steel, it is desirable to remove any rust by preliminary sandblasting treatment.

Because the coats of the inventive composition which are obtained in this way contain only a small amount of ingredients other than the tetrafluoroethylene copolymer, they retain the excellent characteristics of tetrafluoroethylene copolymers, such as their non-stick properties, heat resistance, and chemical resistance. Articles which have been coated with the inventive compositions may be used directly without further modification. However, where necessary, an additional coat composed of, for example, polytetrafluoroethylene or a copolymer of tetrafluoroethylene with a fluorovinyl compound may be formed on the coat obtained using the inventive composition.

In the tetrafluoroethylene copolymer composition-coated steel articles of the invention, not only is the initial adhesive strength of the coat high, the adhesive strength of the coat remains undiminished for a long period of time and in environments where it comes into contact with moisture, and thus has excellent durability. Moreover, because the proportion of ingredients other than tetrafluoroethylene copolymer within the coat can be minimized, the coat has excellent non-stick properties, heat resistance, chemical resistance and the like. Another advantage is that production costs can be reduced because there is no need for complex pretreatment of the steel surface, such as phosphate treatment or chromate treatment, when forming the coat.

TEST METHODS

Melt Flow Rate (MFR)

Using a melt indexer manufactured by Toyo Seiki and following the procedure in ASTM D-3307, a 5-gram sample was placed in a cylinder having an inside diameter of 9.53 mm and maintained at 372±1° C., and held there for 5 minutes, after which it was extruded through an orifice having an inside diameter of 2.1 mm and a length of 8 mm under a load of 49.03 N (piston and weight). The extrusion rate (g/10 min) was calculated as the melt flow rate.

Measurement of PPVE Content

The sample PFA was compressed at 350° C., and water-cooled to give a film having a thickness of about 50 $\mu$m. The absorbance ratio was determined by the formula indicated below from the infrared absorption spectrum (nitrogen atmosphere) of this film. The PPVE content of the sample was then determined using a working curve obtained beforehand with a standard film having a known PPVE content.

$$\text{Absorbance Ratio} = \frac{\text{absorbance (wavelength, 10.07 } \mu\text{m)}}{\text{absorbance (wavelength, 4.25 } \mu\text{m)}}$$

Measurement of Melting Temperature:

This value was determined as the melting peak temperature from a melting curve obtained using a model DSC7 differential scanning calorimeter manufactured by The Perkin-Elmer Corporation. The amount of sample used was 5 mg, and the temperature rise rate was 10° C./min.

Measurement of Reactive End Groups

A model 1720X Fourier transform infrared spectrometer (FTIR) manufactured by The Perkin-Elmer Corporation was used under a nitrogen atmosphere to measure the infrared absorption spectrum for a film having a thickness of about 250 $\mu$m which was produced by compressing the sample PFA at 350° C. The infrared absorption spectrum was similarly measured for a control consisting of a film of PFA in which the end groups were completely fluorinated. Next, a difference spectrum for the sample and the control was obtained by the operation indicated in the formula below, which was carried out using software accompanying the FTIR.

Difference spectrum=A−F×B where A: infrared absorption spectrum of the sample

B: infrared absorption spectrum of the control

F: sample film thickness correction factor

The sample film thickness correction factor was set such that the difference spectrum absorbance in the absorption band at a wavelength of 4.25 μm due to the $—CF_2—$ structures within PFA becomes 0. The absorbances in the resulting difference spectrum for each of the reactive end groups were determined based on the assignments in the table below, and the number of reactive end groups within the copolymer was calculated from the following equation using the correction factors (CF) shown in the table below.

$$\text{Number of end groups per } 10^6 \text{ carbons} = \frac{\text{absorbance} \times \text{CF}}{\text{thickness of sample film (mm)}}$$

| End Group | Wavelength (μm) | Correction factor (CF) |
|---|---|---|
| —COF | 5.31 | 406 |
| —COOH (monomer) | 5.52 | 335 |
| —COOH (dimer) | 5.64 | 320 |
| $—CO_2CH_3$ | 5.57 | 368 |
| $—CONH_2$ | 2.91 | 914 |
| $—CF{=}CF_2$ | 5.58 | 635 |
| $—CH_2OH$ | 2.75 | 2220 |

EXAMPLES

Examples of the invention and comparative examples are given below by way of illustration. The tetrafluoroethylene copolymer used in the examples was a copolymer (PFA) of tetrafluoroethylene and perfluoropropylvinyl ether (PPVE). The melt flow rate (MFR), PPVE content, melting temperature and reactive end groups were measured using the methods described above.

The PFA composition with $—CONH_2$ reactive end groups used in the Examples 1–9, and Comparative Examples 1 and 3 was formed as described by U.S. Pat. No. 3,635,926. Ammonium persulfate was used as the initiator, ammonium perfluorocaprylate was used as the dispersing agent and ammonium hydroxide was used instead of ammonium carbonate as the buffer.

The PFA composition with no detectable reactive end groups used in Comparative Examples 2–4 was formed as described above but with fluorination of the polymer according to the process described in U.S. Pat. No. 4,743,658.

Examples 1–5, Comparative Example 1

These examples illustrate the preparation of compositions of this invention and their bond strengths when coated on a metal substrate. The inventive compositions are compared to a copolymer composition which contains no polyester. The metal substrate has not been pretreated, i.e., the substrate has been degreased but has not been roughened by sand blasting nor has it been subjected to chemical treatment, such as phosphate or chromate treatment. The surface of the article to be coated is smooth.

One hundred parts by weight of a PFA powder having 83 —CONH2 end groups per $10^6$ carbons, a PPVE content of 3.4% by weight, a melt flow rate of 15 g/10 min, a melting temperature of 307° C., and an average particle size of about 10 μm was uniformly dry-mixed with a powder (average particle size, 8 μm) of a non-liquid crystal polyester (U polymer-U-100, manufactured by Unitika, Ltd.) having structural units of the following formula

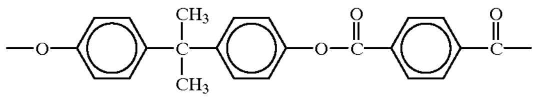

and glass beads (ENM-10, manufactured by Toshiba-Ballotini; average particle size, 6 μm) in the proportions indicated in Table 1, thereby giving powder compositions.

Initial Peel Strength—These powder compositions were dispersed in isopropyl alcohol, flow-coated onto stainless steel sheets (SUS 430; 100x50x1 mm) that had been degreased with acetone, and air-dried, after which they were baked at 380° C. for 30 minutes, thereby forming bonding coats having a length of 100 mm, a width of 15 mm, and a thickness of about 40 μm. Next, PFA sheets having a thickness of 1 mm and containing no other ingredients were placed on these stainless-steel sheets, and heated at 330° C. for 5 minutes, thereby welding the PFA sheets to the bonding coats. These served as the test pieces. The 90-degree peel strength of the PFA sheets welded in this way was measured at room temperature and at a pulling rate of 50 mm/min. This value was treated as the initial peel strength.

Water Resistance—The water resistance of adhesion was evaluated by boiling similar test pieces for 8 hours in tap water, then measuring the peel strength in the same manner as the initial peel strength. This water resistance test measures the impermeability of the PFA coating to the boiling water. Permeation of the boiling water through the coating results in either blistering of the coating or other form of separation of the coating from the steel substrate, manifested quantitatively by a low or absence of peel strength. Preferably, the water resistance obtained by the coating composition of the present invention is characterized by a peel strength after the boiling test of at least 0.5 N/mm. Preferably at least 0.8 N/mm.

The initial peel resistance and water resistance results, along with water resistance after boiling for 40 hours are shown in Table 1.

Reference Example Preparation of Isotropic Polyester

An amount of 10.0 g (0.054 mol) of p,p'-biphenol powder was completely dissolved in 500 ml of aqueous KOH, giving solution A. Next, 10.90 g (0.054 mol) of terephthaloyl chloride powder was dissolved in 300 ml of methylene chloride to give solution B. Solutions A and B were mixed, then vigorously shaken at room temperature, immediately after which the precipitation of a white powder was observed in the liquid mixture. After about 5 minutes of shaking, the precipitated powder was separated off by filtration, washed with water, then washed with organic solvents such as methanol and acetone, and finally washed once again with water. The resulting white powder was then dried for one hour at atmospheric pressure and 100° C., following which drying was carried out in vacuo at 100° C., giving the synthesized polymer.

Polymer yield: 14.8 g (percent yield=86.8%)

Average particle size of polyester: 8.03 μm (Determined using a Shimadzu SA-CP4L centrifugal precipitation-type particle size distribution-measuring apparatus; the solvent was methanol.)

This polymer powder was heated to 500° C. at 20° C./min. the polymer powder turned from white to brown but did not melt. The polyester is determined to be isotropic by the Thermo-Optical Test as described in U.S. Pat. No. 4,118, 372.

Examples 6 and 7

These examples illustrate the preparation of compositions of this invention and their bond strengths when coated on a metal substrate where the isotropic polyester prepared in the Reference Example is used. The metal substrate has not been pretreated, i.e., the substrate has been degreased but has not been roughened by sand blasting nor has it been subjected to chemical treatment, such as phosphate or chromate treatment. The surface of the article to be coated is smooth.

One hundred parts by weight of the PFA powder as described in Example 1 and the polyester powder synthesized in the Reference Example were uniformly dry-mixed in the proportions indicated in Table 1 to give powder compositions. Using these compositions, bonding coats were formed on stainless-steel (SUS 430) sheets in the same manner as in Example 1, following which a PFA sheet was welded thereupon. The results obtained from measurement of the 90-degree peel strength are shown in Table 1.

One hundred parts by weight of the PFA powder in Example 1 and 3 parts by weight of the polyester powder prepared in Reference Example were uniformly mixed, and the resulting powder composition was dispersed in isopropyl alcohol. This dispersion was flow-coated onto a degreased, sandblasted stainless-steel sheet (SUS 304; 100×50×1 mm) and air-dried, then fired for 5 minutes at 330° C. to form a bonding coat having a thickness of about 40 μm. A PFA powder (MP-10; manufactured by DuPont-Mitsui Fluorochemicals Co., Ltd.) was then applied by electrostatic spray coating onto this bonding coat, after which baking was carried out at 380° C. for 30 minutes, thereby forming a PFA topcoat containing no other ingredients that had a thickness of about 60 μm. The 90-degree initial peel strength of the resulting topcoat on the test piece was at least 1 N/mm. Moreover, even when this test piece was exposed for 300 hours to steam at a temperature of 150° C. and a pressure of 5 kg/cm2G, no separation or blistering of the coat was observed whatsoever.

TABLE 1

| | Composition | | | | | Peel strength (N/mm) | | |
|---|---|---|---|---|---|---|---|---|
| | PFA | Polyester | | Inorganic particles | | | After | After |
| | (Parts by weight) | Type | Parts by weight | Type | Parts by weight | Initial | 8 hours boiling | 40 hours boiling |
| Comp. Ex. 1 | 100 | — | 0 | — | 0 | 0.5 | 0.0 | 0.0 |
| Ex. 1 | 100 | U-100 | 1 | — | 0 | 2.4 | 1 | — |
| Ex. 2 | 100 | U-100 | 3 | — | 0 | 2.1 | 0.9 | — |
| Ex. 3 | 100 | U-100 | 0.5 | glass beads | 25 | 3.6 | 3.2 | 2.9 |
| Ex. 4 | 100 | U-100 | 1 | glass beads | 25 | 2.7 | 2.7 | — |
| Ex. 5 | 100 | U-100 | 3 | glass beads | 25 | 2.7 | 2.7 | 2.3 |
| Ex. 6 | 100 | Ref. Ex. | 3 | — | 0 | 4.1 | 3.8 | 3.3 |
| Ex. 7 | 100 | Ref. Ex. | 6 | — | 0 | 2.4 | 2.1 | 2.1 |

Comparative Examples 2–4

These comparative examples illustrate bond strengths of copolymer compositions having no detectable reactive end groups in combination with isotropic polyesters when coated on a metal substrate. The metal substrate has not been pretreated, i.e., the substrate has been degreased but has not been roughened by sand blasting nor has it been subjected to chemical treatment, such as phosphate or chromate treatment. The surface of the article to be coated is smooth.

One hundred parts by weight of a PFA powder having no detectable reactive end groups, a PPVE content of 3.4% by weight, a melt flow rate of 5.6 g/10 min, a melting temperature of 308° C., and an average particle size of about 30 μm was uniformly dry-mixed with a powder (average particle size, 8 μm) of a non-liquid crystal polyester (U polymer-U-100, manufactured by Unitika, Ltd.) and glass beads (EMB-10, manufactured by Toshiba-Ballotini; average particle size, 6 μm) in the proportions indicated in Table 2, thereby giving powder compositions.

These powder compositions were dispersed in isopropyl alcohol, flow-coated onto stainless steel sheets (SUS 430; 100×5×1 mm) that had been degreased with acetone, and air-dried, after which they were baked at 380° C. for 30 minutes, thereby forming bonding coats having a length of 100 mm, a width of 15 mm, and a thickness of about 100 μm. Next, PFA sheets having a thickness of 1 mm and containing no other ingredients were placed on these stainless-steel sheets, and heated at 330° C. for 5 minutes, thereby welding the PFA sheets to the bonding coats. These served as the test pieces. The 90-degree peel strength of the PFA sheets welded in this way was measured at room temperature and at a pulling rate of 50 mm/min. to give the initial peel strength. Fluorinated PFA with no detectable reactive end groups has poor adhesion to stainless steel substrates even when isotropic polyester is present. These results are shown in Table 2.

TABLE 2

| | Composition | | | | |
|---|---|---|---|---|---|
| | PFA no reactive end groups | Polyester U-100 | Inorganic particles | | Peel strength |
| | (Parts by weight) | Parts by weight | Type | Parts by weight | (N/mm) Initial |
| Comp. Ex. 2 | 100 | 0 | — | 0 | 0.0 |
| Comp. Ex. 3 | 100 | 1 | — | 0 | 0.0 |
| Comp. Ex. 4 | 100 | 1 | glass beads | 25 | 0.0 |

Example 8

This example illustrates the preparation of compositions of this invention and the bond strength when coated on a metal substrate which has been pretreated by sand blasting.

One hundred parts by weight of the PFA powder in Example 1 and 3 parts by weight of the polyester powder prepared in Reference Example were uniformly dry-mixed, and the resulting powder composition was dispersed in isopropyl alcohol. This dispersion was flow-coated onto a degreased, sandblasted stainless-steel sheet (SUS 304; 100×50×1 mm) and air-dried, then fired for 5 minutes at 330° C. to form a bonding coat having a thickness of about 40 $\mu$m. A PFA powder (MP-10; manufactured by DuPont-Mitsui Fluorochemicals Co., Ltd.) was then applied by electrostatic spray coating onto this bonding coat, after which baking was carried out at 380° C. for 30 minutes, thereby forming a PFA topcoat containing no other ingredients that had a thickness of about 60 $\mu$m.

The 90-degree initial peel strength of the topcoat measured for the test piece obtained above was at least 1 N/mm. Moreover, even when this test piece was exposed for 300 hours to steam at a temperature of 150° C. and a pressure of 5 kg/cm$^2$G, no separation or blistering of the coat was observed whatsoever.

Examples 9–14, Comparative Example 5

These examples illustrate the preparation of compositions of this invention which include high temperature resistant polymer for wear resistance and their bond strengths when coated on a metal substrate. The inventive compositions are compared to a copolymer composition which contains high temperature resistant polymer but no polyester. The metal substrate has been pretreated by sandblasting.

Aqueous organic dispersions containing 15% by weight of colloidal particles of PFA having 39—$CONH_2$ end groups per $10^6$ carbons, a PPVE content of 3.0% by weight, a melt flow rate of 1.7 g/10 min, a melting temperature of 309° C. and an average particle size of about 0.17 $\mu$m, and 3% by weight of polyamide acid as a polyimide precursor were prepared in furfuryl alcohol, N-methylpyrrolidone and ammonia water. The polyester powder used in Example 1 or the polyester powder synthesized in the reference example was mixed and dispersed therein in the proportions shown in Table 2, thereby giving primer compositions. These primer compositions were applied onto stainless-steel sheets (SUS 430; 100×50×1 mm) that had been degreased and sandblasted, then dried to form a primer layer having a thickness of about 8 $\mu$m. A PFA powder (MP-10) was electrostatic spray-coated onto this primer layer, then baked at 380° C. for 30 minutes, thereby forming a PFA topcoat having a thickness of about 60 $\mu$m and containing no additives. The 90-degree peel strength for the resulting test pieces was measured. The results are shown in Table 3.

TABLE 3

| | Composition | | | | Peel strength (N/mm) | | |
|---|---|---|---|---|---|---|---|
| | PFA | Polyester | | | | After | After |
| | (Parts by weight) | Type | Parts by weight | Polyamide acid Parts by weight | Initial | 8 hours boiling | 40 hours boiling |
| Comp. Ex. 5 | 100 | — | 0 | 20 | >1 | >1 | 0.3 |
| Ex. 9 | 100 | U-100 | 4 | 20 | >1 | >1 | >1 |
| Ex. 10 | 100 | U-100 | 8 | 20 | >1 | >1 | >1 |
| Ex. 11 | 100 | U-100 | 16 | 20 | 1.0 | 1.0 | 0.8 |
| Ex. 12 | 100 | U-100 | 32 | 20 | 0.8 | 0.5 | 0.5 |
| Ex. 13 | 100 | Ref. Ex. | 4 | 20 | >1 | >1 | >1 |
| Ex. 14 | 100 | Ref. Ex. | 8 | 20 | >1 | >1 | >1 |

What is claimed is:

1. A composition in the form of a baked layer comprising (1) a copolymer derived from units of tetrafluoroethylene and fluorovinyl compound, said copolymer having reactive end groups, and (2) an isotropic polyester resin derived from units of aromatic dicarboxylic acid and aromatic diol.

2. The composition of claim 1 wherein the fluorvinyl compound is perfluoro(alkyl vinyl ether).

3. The composition of claim 1 wherein the reactive end groups are selected from a group consisting of —COOH, —$CNH_2$, —$CH_2OH$, —$COOCH_3$, —COF and —CF═$CF_2$.

4. The composition of claim 3 wherein at least one of the reactive end groups is present in a ratio of 6 or more groups per $10^6$ carbons in the tetrafluoroethylene copolymer.

5. The composition of claim 1 wherein the isotropic polyester resin is present in the amount of 0.1 to 20 weight % based on the combined weight of the tetrafluoroethylene copolymer and the isotropic polyester resin.

6. The composition of claim 1 and in addition, heat resistant polymer resin.

7. The composition of claim 1 containing an amount of reactive end groups effective in producing an adhesive bond having an initial peel strength of at least 1N/mm.

8. An article coated with a baked composition wherein said composition prior to baking comprises (1) a copolymer derived from units of tetrafluoroethylene and fluorovinyl compound, said copolymer having reactive end groups, and (2) an isotropic polyester resin derived from units of aromatic dicarboxylic acid and aromatic diol.

9. The article of claim 8 wherein the article is steel.

10. A process for coating a steel article which comprises:

(a) applying to the article a composition of (1) a copolymer derived from units of tetrafluoroethylene and fluorovinyl compound, said copolymer having reactive end groups, and (2) an isotropic polyester resin derived from units of aromatic dicarboxylic acid and aromatic diol, and (b) baking the article at a temperature of from 320° C. to 450° C.

* * * * *

UNITED STATES PATENT AND TRADEMARK OFFICE

CERTIFICATE OF CORRECTION

PATENT NO : 6,153,303

DATED : November 28, 2000

INVENTOR(S) : Shinichi Namura, Takahiko Iwasaki

It is certified that error appears in the above-identified patent and that said Letters Patent is hereby corrected as shown below:

On the title page of U.S. Patent 6,153,303:

change "Sinichi Namura" to --Shinichi Namura--.

Signed and Sealed this

First Day of May, 2001

*Attest:*

Nicholas P. Godici

NICHOLAS P. GODICI

*Attesting Officer*

*Acting Director of the United States Patent and Trademark Office*